United States Patent [19]

DiGregorio et al.

[11] Patent Number: 4,940,545
[45] Date of Patent: Jul. 10, 1990

[54] AEROBIC WASTE SLUDGE DIGESTER-THICKENER ORBITAL SYSTEM AND METHOD

[75] Inventors: David DiGregorio; Richard J. Eismin, both of Salt Lake City; Frederick M. Riser, Sandy, all of Utah

[73] Assignee: Baker Hughes, Inc., Houston, Tex.

[21] Appl. No.: 330,017

[22] Filed: Mar. 29, 1989

[51] Int. Cl.$^5$ ............................................. C02F 3/14
[52] U.S. Cl. .................................. 210/609; 210/629; 210/803; 210/195.1; 210/199; 210/219; 210/256; 210/528; 210/532.1; 210/926; 210/916
[58] Field of Search ............... 210/609, 620, 629, 803, 210/804, 194, 219, 256, 319, 525, 528, 534, 535, 536, 926

[56] References Cited

U.S. PATENT DOCUMENTS

| | | | |
|---|---|---|---|
| 2,649,412 | 8/1953 | Kivari et al. | 210/528 |
| 3,002,400 | 10/1961 | Scott | 210/528 |
| 3,462,360 | 8/1969 | McKinney | 210/926 |
| 3,510,110 | 5/1970 | Klein | 210/926 |
| 3,534,857 | 10/1970 | Berk | 210/525 |
| 3,809,242 | 5/1974 | Bosje | 210/219 |
| 4,282,102 | 8/1981 | Rooney | 210/926 |
| 4,323,367 | 4/1982 | Ghosh | 210/926 |
| 4,324,655 | 4/1982 | Muskat | 210/134 |
| 4,487,692 | 12/1984 | Kersten | 210/926 |
| 4,652,371 | 3/1987 | Love | 210/219 |

FOREIGN PATENT DOCUMENTS

| | | |
|---|---|---|
| 3028039 | 9/1981 | Fed. Rep. of Germany . |
| 3429831 | 12/1985 | Fed. Rep. of Germany . |
| 1129055 | 10/1968 | United Kingdom . |

OTHER PUBLICATIONS

EPA Publication 62511-74-006, pp. 5-20 to 5-28 (referenced on page 2 lines 24 to page 3, line 3 of Applicants' specification.).

Primary Examiner—Peter Hruskoci
Assistant Examiner—Christopher Upton
Attorney, Agent, or Firm—Skjerven, Morrill, MacPherson

[57] ABSTRACT

A thickener well is provided in one end of a digester orbital ditch having a pair of channels and an elongated center partition spaced from a pair of ditch endwalls, the overall ditch forming a basin for digestion of wasted sludge. A curved endwall of the ditch provides a common curved top outer peripheral wall of the thickener well. The remainder of the well has a cylindrical configuration integral with the orbital ditch bottom and extending downwardly therefrom to a position below the horizontal plane of the ditch bottom. A sludge raking structure is positioned at the bottom of the well for periodically raking settled sludge into a sludge outlet at the bottom of the well. A surface aerator is provided between and spaced from the other ditch endwall and a juxtaposed end of the partition or other aeration apparatus mounted in a channel(s) to aerate and propel a liquid-solids sludge mixture wasted from a secondary treatment apparatus and fed into the orbital ditch. The mixture is circulated in the ditch and across and through a top portion of the well. The orbital ditch may be decanted by turning off the aerator, allowing a clear liquid top layer to form in the ditch and decanting the clear liquid from the tank by lowering a weir or by adding additional activated sludge to the ditch to displace clear liquid over a fixed weir.

18 Claims, 1 Drawing Sheet

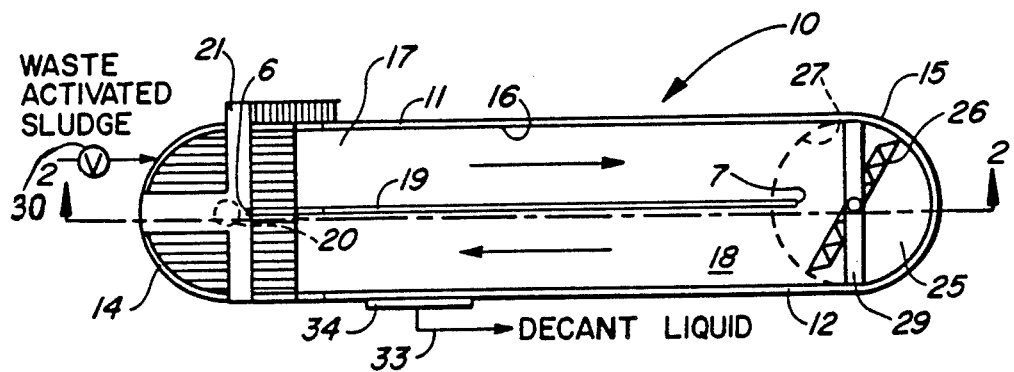
FIG._1.
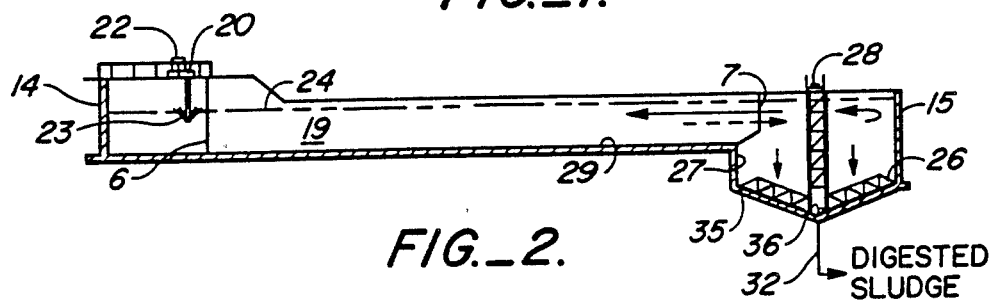
FIG._2.
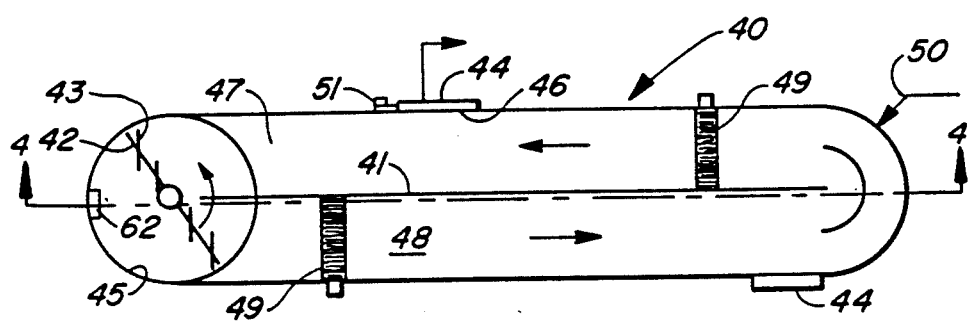
FIG._3.
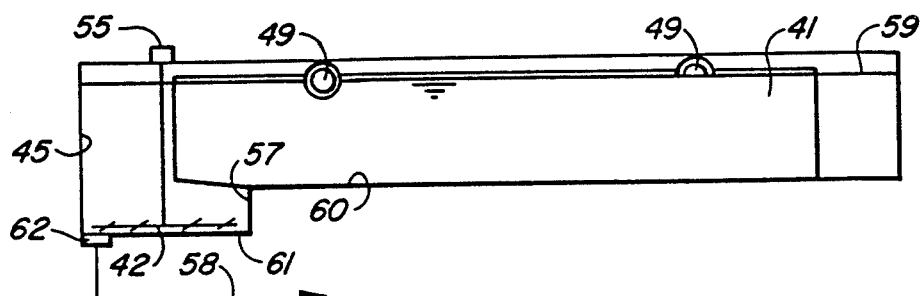
FIG._4.

AEROBIC WASTE SLUDGE DIGESTER-THICKENER ORBITAL SYSTEM AND METHOD

BACKGROUND OF THE INVENTION

1. Field of the Invention

This invention relates to a system of aerobically treating waste sludge. More particularly, the invention is directed to an orbital system and method for treating by digestion and thickening bacterial microorganism-containing sludge wasted from an industrial or municipal wastewater treatment process and apparatus.

2. State of the Art

In a wastewater process employing the activated sludge process waste water impurities including domestic wastes, sugars, proteins, carbohydrates and other nitrogen-containing materials are decomposable by microorganisms, as is well known in the art. As the impurities are decomposed a sludge of settled material and microorganisms is wasted from the process either on a continuous or non-continuous basis. The purpose of sludge wasting is to keep solids from building up in the system. Sludge from the process is normally transported by pumping to a digester for treatment prior to landfill or other disposal so as to reduce the volatile organic content of the sludge, reduce the sludge volume, reduce the pathogenic organisms present in the sludge, reduce its odor potential and improve sludge dewaterability, and for other reasons of lesser importance. Various prior art types of digesters and various digestion and stabilization processes have been proposed and used.

The present invention is directed to an apparatus and method involving improvements in aerobic digestion. Current practice for aerobic digestion is to first transport the waste sludge generated in a secondary activated sludge system into a separate adjacent thickening tank of the gravity or other type and then transport the thickened sludge to a separate aerated digester for 10-30 days. Biological activity in the tank digests the sludge over that time.

In addition, these digesters provide sludge holding capability for periods of time when the ultimate disposal method is not available (i.e., the sludge truck is broken or the landfill is closed, etc.) and they provide a means of thickening the sludge, called decanting. Decanting is simply allowing the sludge to settle by turning off the aeration for a period of time until a clear liquid layer forms on top of the sludge. This clear liquid is then removed from the digester tank which leaves behind a thicker sludge having less volume. Decanting can be a fill and draw operation where the water level in the tank varies or the clear liquid can be displaced by sludge being fed to the tank. There are also some floating weir decanters in use. In some cases the sludge is thickened in a separate thickener after digestion. The purpose of this is again to thicken the sludge and reduce its volume.

Aerobic digestion is described more fully on pages 5-20 to 5-28 of U.S. Environmental Protection Agency (EPA) Publication 62511-74-006 entitled "Process Design Manual for Sludge Treatment and Disposal" dated October 1974. As pointed out on page 5-23 aerobic digestion has disadvantages which may include high operating costs and poor dewatering characteristics on vacuum filters. A relatively long detention time of 10-30 days or more is necessary to break down the organic matter and control pathogenic organisms and is common practice. In small treatment systems (0.1 mgd) the digestion tank can also act as a sludge thickening unit. The current practice is to separately pump air or oxygen into the digester through diffuser pipes in the liquid-solids mass in the tank in an amount of from about 20-60 cfm/1000 cubic feet, dependent on the presence of primary and/or excess activated sludge, to keep the solids in suspension and maintain a dissolved oxygen (DO) between 1-2 mg/l (page 5-26).

It has been common for some years to use a so-called orbital oxidation system or oxidation ditch to biologically treat wastewater. Such systems are exemplified by the U.S. patent to Klein 3,510,110 where sidewalls and a center partition form a race track-like essentially closed circuit with a surface aerator positioned adjacent to one end of the partition to both aerate the mixed liquor in the tank and to provide the motive force for circulation of the mixed liquor around the circuit. Horizontal brush-type aerators, jet-type aerators or rotating disc-type aerators have also been employed in activated sludge sewage orbital purification processes. As seen in Stensel et al., (4,303,516) clarifiers, (termed intraclarifiers) which have a sludge thickening function have been placed into a channel of an orbital ditch and function to decant off clarified liquid from a portion of the overall channel mixed liquor flow introduced into the clarifier and to allow settled sludge to be returned to the channel from the intraclarifier.

Further, it has been known to use an oxidation ditch as an aerobic digester per se. Reference is also made to McKinney, U.S. Pat. No. 3,462,360 which shows a loop-type secondary aerobic treatment apparatus in which liquid waste is treated and a separate settling basin provided defining a quiescent liquid zone for conducting tertiary treatment. Settled algae may be returned from the settling basin to the loop or withdrawn from the facility.

SUMMARY OF THE INVENTION

The present invention utilizes an orbital basin combined with thickener well in a common vessel. Such digester-thickener apparatus provides a very large surface area which promotes settling and aids in decanting the vessel, provides a sludge thickener mechanism which results in a highly dense discharge sludge for disposal, provides for minimal mixing energy to maintain the settling sludge in the vessel in suspension during the digestion phase of the method, and minimizes capital and operational costs due to the combination of two unit processes in a single vessel.

Further, the continuous flow of liquid across and through the thickener keeps the sludge from becoming septic, since the bulk of the liquid is constantly being exposed to aeration as it orbitally circulates. This helps control odors and floating sludge. The sludge which falls out of suspension into the thickener area is the densest, most digested material, while the lighter, more volatile material will tend to recirculate in the active channel portions of the digester. Any sludge or scum which tends to float in the thickener area is entrained in the flow of the ditch and reaerated. This contrasts with an external thickener where the scum and floating material build up and become a problem.

In the system of the invention the flow of the sludge around the ditch tends to elutriate or wash the sludge in the thickener which has been shown to promote better thickening. Additionally, the flow of the liquid-solids in the ditch will prevent freezing which is a problem in external thickeners in cold climates since the thickener normally has a quiescent top surface. Still further, the aerobic liquid-solids circulating over the thickener top will prevent odors from becoming a problem. In many separate prior art thickeners covers and expensive odor control systems are necessary.

The above advantages result by providing a method utilizing an orbital vessel with an appropriate surface aerator at one end of the partition wall or other aeration/propelling mechanism in one or more of the flow channels. The channels generally define an aerobic digestion section or zone of the ditch. At the other end of the partition and with an adjacent end wall of the vessel a thickener section or zone is defined with a depressed cylindrical portion integral with the ditch bottom. The aeration device also functions as a mixer. A rake assembly shaft driven from above the vessel is provided at the bottom of the thickener section in the cylindrical thickener portion. Sludge is removed from the center of the bottom of the cylindrical thickener portion. A decant weir(s) is provided extending along the outside periphery of a channel(s) and a sludge inlet provided downstream from the aerator/mixer normally in a first channel.

BRIEF DESCRIPTION OF THE DRAWINGS

FIG. 1 is a schematic plan view of the combined orbital digester and thickener utilizing a surface aerator.

FIG. 2 is a longitudinal cross-sectional view of the combined digester and thickener taken on the line 2—2 of FIG. 1.

FIG. 3 is a schematic plan view of a further embodiment of the invention utilizing horizontal rotating brush aerators.

FIG. 4 is a longitudinal cross-sectional view of the FIG. 3 embodiment taken on the line 4—4 of FIG. 3.

DETAILED DESCRIPTION

The combined orbital digester and thickener system 10 is seen in FIGS. 1 and 2. The system includes a basin 16 formed by vertical or slightly inclined parallel sidewalls 11 and 12 and normally curved upstanding endwalls 14 and 15 integral therewith. A central elongated longitudinal partition 19, as is known in the art, separates the basin 16 into parallel channels 17 and 18 forming with the curved endwalls an essentially closed flow loop as indicated by the arrows. Aeration and a flow propelling force is provided by a surface aerator 20 supported by a walk platform 21 extending across endwall 14. The surface aerator is generally aligned with the partition longitudinal axis and spaced from the partition end 6. Rotation of the aerator mixes and aerates the waste activated sludge in the basin and propels that solids-liquid mixture around the partition into channel 17. Wasted activated sludge is fed into the basin normally at or near the aerator to provide rapid mixing with the solids-liquid mixture already flowing around the orbital pathway and entering the aerator from channel 18. The surface aerator is of the type having a series of radial blades 23 shaft-driven by a motor 22 which blades beat air from above the solids-liquid surface level 24 of the basin into the water-containing activated sludge and which keep the solids-liquid mixture in motion through the channels. In a typical application the velocity of the solids-liquid mixture is from about 0.7 ft. per second to about 1.3 ft. per second. Such velocity is high enough to continue the flow without sludge settling out in the channels but low enough to have a sufficient lowering of that velocity in the larger transverse cross-sectional area adjacent and between the endwall 15 and partition end 7 forming the thickening zone in the basin.

The thickening zone is bounded by semicircular endwall 15 and a thickener well 25 constructed integral with endwall 15 so that endwall 15 is common to the overall basin and to the upper outer periphery of the thickener well 25. The remainder of well 25 takes the form of a half right circular cylinder 27 integrally extending downwardly from channel bottom 29 inward of partition end 7 and faired into a lower portion of semicircular endwall 15. Partition end 7 extends toward the rake vertical shaft a sufficient distance into the thickener zone so as to (1) minimize short circuiting of the flowing liquid-solids mixture so that most passes through the thickening zone and (2) still permitting a reduction in flow velocity in the thickening zone so as to assist in sludge settling in that zone. The well 25 is closed at its bottom in this preferred embodiment by an inverse conical surface 35 having a sludge removal outlet 36 at its center. A rake mechanism 28 includes rake arms 26 which extend radially along the conical surface 35 to transport solids settling on the rake and conical surface 35 to the sludge outlet 36. Digested sludge may be withdrawn by a pump (not shown) through line 32.

Wasted sludge is fed to the basin through valve 30 into an aeration zone surrounding aerator 20 and propelled around the basin as shown by the arrows (FIG. 1). The horizontal arrows in FIG. 2 illustrate the solids-liquid flow path through channel 17, across and through a top portion of well 25 and then back through channel 18. Vertical arrows represent settling of the sludge into the cylindrical bottom portion of the thickener deep well. The full cylindrical lower section of the well above the rakes and below ditch bottom 29 is a relative quiescent zone little impacted by the circulation flow in the channels and around the basin ends.

FIGS. 3 and 4 show a second embodiment of an orbital digester-thickener 40 in which a pair of channels 47 and 48, curved endwalls and a partition 41 spaced therefrom form an orbital flow path in a basin. A pair of horizontal rotary brush aerators 49 are positioned so that the radial ends of the brushes extend into the liquid-solids surface level 59 in channels 47 and 48 to both aerate and orbitally propel the liquid-solids waste. As in FIGS. 1 and 2, a deep thickener well is formed integral with the one endwall 45 with a cylindrical section 57 extending integrally from the basin bottom 60 to a position lower than the basin bottom 60. Radial rake arms 42 with attached angular rake blades 43 are shaft-driven by a motor 55. In this alternative embodiment, a flat circular floor 61 is provided in the thickener zone with radial rake arms and angular blades scraping settled sludge radially outwardly to a sludge pocket 62 along the outer peripheral wall 45 for removal. Waste activated sludge is fed into the basin through line 50 and digested sludge withdrawn for removal through line 58 extending from the bottom sludge pocket in the well. Clear liquid may be decanted over vertically adjustable or fixed weir 46 and into a trough 44 for disposal. A suitable weir jack mechanism 51 as known in the art may be utilized for adjusting weir 46.

Activated waste sludge as used herein includes both primary sewage from a primary clarifier whose effluent is fed into the aeration basin of a secondary treatment activated sludge system as well as waste activated sludge from a secondary clarifier. Effluent from secondary treatment is normally sent to a secondary clarifier which may be a separate vessel sited away from the aeration basin or an intraclarifier in the aeration basin. Waste activated sludge from the secondary clarifier may in part be returned to the secondary aeration vessel or sent to a sludge digester for digestion. Either or both of these sludge sources may comprise the feed to the orbital digester-thickener of this invention.

Normal operation of the above described apparatus permits performance of a method of digesting sludge wasted from a secondary activated sludge treatment apparatus or process. The method comprises providing an orbital ditch having a pair of extended channels essentially forming a digestion zone; forming a cylindrical deep well integral with one end of the orbital ditch and the ditch bottom to form essentially a circular thickening zone; feeding water-containing activated sludge into the ditch at a position displaced from the deep well; aerating, mixing and propelling the activated sludge through a channel, across and through an upper part of the thickening zone and into the other channel; thickening the sludge by allowing settling of dense portions of the sludge into the deep well; and withdrawing settled sludge from the bottom of the well. To aid in removal of settled sludge the sludge may be raked into a center or side outlet at the well bottom. The method also may include a step of decanting clear liquid from the ditch preferably at a position downstream of the thickening zone. This step preferably may be done by periodically stopping the surface aeration and propelling means and closing valve 30 and sludge outlet 36 so that a clear liquid layer forms at the top of the basin and a portion of that layer is decanted either by lowering the outlet weir or by opening valve 30 and feeding additional wasted sludge to the basin so as to displace clear liquid over a fixed weir. Thickened digested sludge may be withdrawn from the bottom of the well at any time during the settling/feed/decant cycle or during normal operation of the aerator.

| Design Example | |
|---|---|
| MGD Activated Sludge Plant | |
| 3000 lbs/d of waste activated sludge | |
| 40,000 gpd of waste activated sludge | |
| Digester Design Criteria | |
| Temperature, 20° C. | |
| Sludge Age, 40 days | |
| Solids concentration, 2.5% TS | |
| Volatile solids destruction, 40% | |
| Volume, 430,000 gal | |
| DO in aeration zone, 2 mg/l | |
| Digester Size | |
| Length | 155' |
| Width | 43' |
| Channel width | 20' |
| Channel depth | 10' |
| Thickener diameter | 41' |
| Thickener side wall depth (outer periphery) | 12' |
| Digester Operation | |
| Feed schedule | 40,000 gal/day |
| Decant rate | 10-12 in/day |
| Aerator size | 40 HP |
| Minimum aerator horse power | 25 |
| Maximum aerator horse power | 40 |
| Thickened digested sludge rate | 2150 lb/day |
| Thickened digested sludge | 3.5-4.0% TS 55-60% VS |

Digester/Thickener Operation (Typical)

Sludge Wasting:

Pump 40,000 gal of waste activated sludge to digester each day on the average. Prior to initiating the feed sequence, turn the aerator off for 2-6 hours to allow a clear liquid supernatant to form at a depth of at least 18-24". Lower the digester weir by 10-12" and decant the clear supernatant. Raise the weir and begin the feed pumping sequence.

At 2-5 day intervals as practical, withdraw the entire contents of the sludge thickener i.e. the bottom cylindrical volume, for disposal by actuating the rake mechanism so that settled sludge is moved into the center or side pocket outlet for pumping to a truck or other transport means to fill disposal. Such procudure can be done in lieu of supernating as noted above.

The above description of embodiments of this invention is intend to be illustrative and not limiting. Other embodiments of this invention will be obvious to those skilled in the art in view of the above disclosure.

We claim:

1. In combination, an orbital ditch comprising an orbital aerobic digestion section formed by a pair of uncovered parallel flow channels bounded by a pair of liquid-confining walls, and an upstanding elongated center partition between and spaced from said walls;
   a ditch bottom; and
   ditch endwalls spaced from end sections of said partition to form with said channels a closed loop liquid-solids flow path;
   means in said closed loop flow path for aerating and transporting a waste activated sludge liquid-solids mixture around said closed loop flow path; and
   a cylindrical thickener section within the confines of said flow path, said thickener section including:
   a sidewall formed by one of said ditch endwalls;
   a thickener section bottom extending to a plane below said ditch bottom; and
   a rotatable thickener rake having blades positioned in said thickener section above said thickener section bottom and below said ditch bottom for transporting sludge settling in said thickener section to a sludge outlet in said thickener section bottom.

2. The combination as set forth in claim 1 in which said one of said ditch endwalls is vertical and has a substantially semicircular plan curvature and said thickener section comprises a top portion formed by said semicircular ditch sidewall and a lower portion formed by a cylindrical well bottom portion extending from said ditch bottom to a position below said ditch bottom.

3. The combination as set forth in claim 2 wherein said thickener section bottom has an inverse conical surface with a center sludge outlet, said rake blades being positioned so as to be operable to move sludge settled on said thickener section bottom to said sludge outlet along said inverse conical surface.

4. The combination as set forth in claim 1 further including means in said orbital ditch for aerating and propelling a mixture of solids and liquid around said flow path including through and across a top portion of said thickener section.

5. The combination as set forth in claim 4 further including means for intermittently turning-off said means for aerating and propelling to promote settling in said thickener section and for producing a relatively clear liquid top layer of liquid in said orbital ditch.

6. The combination as set forth in claim 5 further including a weir for decanting said clear liquid and further including means for adding waste sludge to said orbital ditch for displacing said clear liquid over the weir.

7. The combination as set forth in claim 6 further including means for withdrawing settled sludge through said sludge outlet during operation of said decanting weir or during operation of said orbital ditch when said means for aerating is turned-on.

8. The combination as set forth in claim 1 wherein said means for transporting a liquid-solids mixture through said channels and through said thickener section operates such that settling sludge is non-septic and washed.

9. The combination as set forth in claim 1 wherein said means for aerating and transporting a liquid-solids mixture through said channels and said thickener section operates such that freezing of liquid at the top surface of said thickener section is prevented and wherein a resultant aerobic liquid-solids mixture circulates over the thickener section preventing emission of odors from said thickener section.

10. A combined orbital ditch and thickener structure comprising a ditch bottom, an pair of parallel ditch sidewalls extending upward from said bottom and a pair of ditch endwalls extending upward and connecting said sidewalls forming a basin, a longitudinal partition generally parallel to said ditch sidewalls and having ends spaced from said ditch endwalls forming a looped pathway in said basin, means for aerating and propelling a waste activated sludge around said looped pathway, and a cylindrical thickener section integrally extending downwardly from one end of said ditch bottom to form a deep cylindrical well in said ditch, said well integrally connected to one of said ditch endwalls such that a waste activated sludge liquid-solids mixture flowing through said looped pathway flows through and across a top portion of said thickener section and internally around said one endwall and a juxtaposed end of said partition and wherein digested sludge settles out in said deep cylindrical well, and wherein rake means for raking settled solids to a settled solids outlet in a bottom of said thickener section are included in said thickener section.

11. The structure of claim 10 wherein said aerating and propelling means include means spacedly positioned between the other of said endwalls and the other end of said partition.

12. The structure of claim 10 in which said ditch sidewalls and said ditch endwalls are vertical.

13. The structure of claim 10 in which said ditch sidewalls and said ditch endwalls are inclined.

14. The structure of claim 10 wherein said aerating and propelling means include a pair of parallel channels between said ditch sidewalls and said partition and means in at least one channel.

15. A method of digesting sludge wasted from a secondary activated sludge treatment apparatus comprising:

providing an orbital ditch having a bottom and a pair of channels forming a digestion zone;

forming a deep cylindrical well at one end of said ditch integral with said ditch and extending between said channels and downwardly from said ditch bottom to form a thickening zone;

feeding water-containing waste activated sludge into said ditch at a position displaced from said well;

aerating and propelling said activated sludge through one of said channels, across and through a top portion of said well and through the other of said channels; said propelling step comprising propelling said water-containing waste activated sludge at a velocity high enough to prevent sludge settling out in said channels and low enough to allow sludge to settle out in said deep well thickening said activated sludge by settling said sludge in said thickening zone; and raking settled sludge in said well to an outlet and withdrawing settled sludge from said well.

16. The method of claim 15 wherein said activated sludge is fed into said ditch adjacent to a location of aerating and propelling step.

17. The method of claim 16 further comprising decanting a relatively clear liquid from said ditch at a position downstream of said thickening zone.

18. The method of claim 17 further comprising stopping said aerating and propelling step for a time sufficient to form a clear liquid in said channels and decanting said clear liquid from said ditch by adding additional activated sludge into said ditch.

* * * * *